H. H. MORGAN.
CEMENT.
APPLICATION FILED MAR. 18, 1915.

1,221,571.

Patented Apr. 3, 1917.

Witnesses:
Harry S. Gaither
Amy Jehle

Inventor
Harold H. Morgan
by Banning & Banning
Attys.

UNITED STATES PATENT OFFICE.

HAROLD H. MORGAN, OF CHICAGO, ILLINOIS, ASSIGNOR TO GEORGE S. JOHNSTON CO., OF CHICAGO, ILLINOIS, A CORPORATION OF ILLINOIS.

CEMENT.

1,221,571.      Specification of Letters Patent.      Patented Apr. 3, 1917.

Application filed March 18, 1915. Serial No. 15,298.

*To all whom it may concern:*

Be it known that I, HAROLD H. MORGAN, a citizen of the United States, residing at Chicago, Cook county, Illinois, have invented certain new and useful Improvements in Cements, of which the following is a specification.

The present invention has reference to certain improvements in cements, and has particular reference to improvements in cements for joining eye glass crystals to their mountings. The cement can be used for many other purposes than the foregoing, but its composition, both as to kind and proportions of ingredients, is made up particularly to meet the conditions which are found in the joining of eye glass crystals to their mountings.

In the joining of eye glass crystals to their mountings the most important conditions to be met are the fact that the crystal is to be joined to a metal; that the cemented joint is subjected to sudden and extreme variations of temperature; that the parts are subjected to frequent and severe jars and similar strains; and that the available area of cemented junction is comparatively very small. The first mentioned condition necessitates a choice of ingredients such that the completed cement will adhere to the metal as well as to the crystal. The second mentioned condition imposes the additional condition that in many cases the crystal has a temperature co-efficient of lineal expansion different from that of the metal to which it is to be joined. That is to say, whereas the cemented surface of the crystal may have the same lineal dimensions as the dimensions of the metal when the parts are at a given temperature, it may have different lineal dimensions from those of the metal when the temperature has been changed by either rising or falling. The difference in expansion or contraction will throw a strain upon the cement and upon the cemented joint such that the crystal and the mounting will be torn apart unless the cement be possessed of exceptionally high qualities of adhesion, strength and ductility. The third and fourth mentioned conditions also require that the cement shall have a very high adhesive quality.

Shellac and other similar fusible materials possess the quality in themselves of adhering tenaciously to crystals as well as to such metals as are ordinarily used in the manufacture of eye glass mountings. Gold and copper are ordinarily used for this purpose. However, shellac and similar materials are naturally brittle and lacking in ductility. They cannot be distorted (at ordinary temperatures) without breaking, and it is extremely difficult, if not impossible, to secure a firm connection between a mass of shellac on the one hand and the crystal or metal on the other. It is, therefore, evident that shellac and other analogous materials are not best suited for the cementing conditions above outlined as long as the said materials are used in their raw or natural condition.

I have discovered the fact that if shellac and other similar cementitious materials be sub-divided into very thin layers or threads its physical properties will undergo a very substantial change, so that it will become possessed of a high degree of ductility, permitting it to be bent or otherwise distorted to a very material extent without fracture; and I have also discovered that when so sub-divided it can be readily caused to join or adhere in its sub-divided condition to the crystal on the one hand and to the metal on the other. I have ascertained as a result of these discoveries that if the cementitious material extending between the crystal and the metal be thus sub-divided into very thin layers or plates or threads, interwoven with each other, but constituting a honey comb of very thin layers, a maximum degree of ductility and strength combined together will be produced in the cemented joint, thereby meeting in the best manner the requirements imposed for the joining of eye glass crystals to their mountings.

In the past there have been prepared cements in which shellac and the like has been mixed with fine particles of other non-cementitious material, but the mixtures so prepared have not been designed in the proper manner to secure the sub-division of the shellac into the extremely fine sub-divisions desired. Consequently such cements have not been possessed of the necessary ductility to properly meet the conditions imposed by the class of work for which the cement of the present application is particularly intended. The proportions and sizes of the particles of the non-cementitious material, as compared to each other, and as compared to the shellac, or other cementitious material, have not been proper for the meeting of the requirements and conditions above outlined.

If there be used for the base of the cement a non-cementitious grog having particles of a uniform size the percentage of voids in said grog will be large, and if throughout this grog there be flowed shellac or other cementitious material, said shellac or the like will lie in comparatively thick layers and will lie in the thickest possible layers for a grog having particles of a given size. On the other hand, if there be combined with particles of a given substantially uniform size other particles of a smaller size these smaller particles will partially fill in the voids between the larger particles, so that if afterward the shellac or other cementitious material be flowed through the mass of the material it will not have to fill voids of as large size as formerly, and, consequently, the shellac will be able to lie in thinner layers. In like manner, if a still smaller size of particles be incorporated into the grog these in turn will partially fill the remaining voids, thereby again reducing the resultant thickness of the layers or plates of shellac or the like.

As an example of a grog composed of small particles so related and proportioned as to give a minimum percentage of voids, I will mention a grog having its particles so proportioned and related that 100 per cent. will pass a 50 mesh screen, 60 per cent. will pass a 100 mesh screen, and 41.6 per cent. will pass a 200 mesh screen. In this example I have mentioned the number of meshes per lineal inch. It will also be understood that if screens for other sizes of meshes be mentioned, the percentages or grog particles passing the different screens will be correspondingly adjusted in accordance with well understood principles in order to obtain a grog having substantially a minimum percentage of voids.

Having devised or built up the grog in such manner as to leave a minimum percentage of voids the shellac or other cementitious material may be flowed in so as to fill the voids, thereby giving a substantially compact mass of cement having all of its particles bound and cemented together into a solid body with the use of a minimum percentage of cementitious material. I have found by experiment, however, that it is desirable to use somewhat of an excess of cementitious material. This seems to be for the reason that a certain amount of cementitious material is necessary to coat over the grog particles, as well as for the reason which I will now explain. Shellac and similar materials possess the quality of softening and melting when heated, but they also undergo decomposition and vaporization if their temperature be raised materially above the melting point. Therefore, such materials cannot be brought into an extremely thin condition such that they will possess extreme fluidity without at the same time decomposing or vaporizing them. It, therefore, follows that shellac cannot be caused to flow through the mass of a grog wherein the passages or opening are extremely minute. In other words, if the openings in the grog be too small the shellac will not flush through the body of the grog.

Now the shellac when in its molten condition will all pass a screen of 200 meshes to the inch and even finer. The presence in the grog of 41.6 per cent. of material which will pass a 200 mesh screen indicates that if this material be entirely eliminated and replaced with shellac there should be supplied 41.6 per cent. of shellac or the like. This, however, would not bring the shellac into the finest sub-divisions, inasmuch as all of the grog material capable of passing a 200 mesh screen would have been replaced by shellac.

Again considering the grog having substantially 41.6 per cent. capable of passing a 200 mesh screen, such a grog will have approximately 20 per cent. of voids, or even a less percentage. Therefore, if this per cent. of shellac be added to the mixture it will presumably serve to fill up the voids thus giving a solid dense cement without voids. As previously explained, however, a portion of the finer materials should be removed from the grog, and replaced by shellac or other cementitious material so that I have found that from 30 to 40 per cent. of shellac or the like is a desirable percentage.

It will be observed that the conditions for the production of the desired cement are substantially the use of a grog having particles of different sizes so proportioned as to give a minimum percentage of voids. Therefore, the exact composition of the grog material need not be taken into account, inasmuch as the particles of different sizes may be composed of the same or different materials.

As examples of cements constructed or built upon according to the disclosures of the present invention, I will mention the following:

No. 1. Shellac 20 per cent., grog 80 per cent. Grog composed of silex 27 per cent., ground glass special 18 per cent., and ground glass 35 per cent. 41.1 per cent. cement passing 200 mesh screen, 61.3 per cent. passing 100 mesh screen, and 100 per cent. passing 50 mesh screen. It will be observed that of the 41.1 per cent., 20 per cent. is shellac and 21.1 per cent. is grog particles.

No. 2. Shellac 30 per cent., grog 70 per cent. Grog composed of silex 15 per cent., ground glass special 20 per cent., and ground glass 35 per cent. 41.8 per cent. cement passing 200 mesh screen, 61.4 per cent. passing 100 mesh screen, and 100 per cent. passing 50 mesh screen. It will be observed that of the 41.8 per cent. 30 per cent. is shellac and 11.8 per cent. is grog particles.

No. 3. Shellac 40 per cent., grog 60 per cent. Grog composed of silex 2 per cent., ground glass special 23 per cent., and ground glass 35 per cent. 41.6 per cent. cement passing 200 mesh screen, 61.4 per cent, passing 100 mesh screen and 100 per cent. passing 50 mesh screen. It will be observed that of the 41.6 per cent. 40 per cent. is shellac and 1.6 per cent. is grog particles.

No. 4. Shellac 50 per cent., grog 50 per cent. Grog composed of ground glass special 13 per cent., and ground glass 37 per cent. 50.1 per cent cement passing 200 mesh screen, 61.4 per cent. passing 100 mesh screen, and 100 per cent. passing 50 mesh screen. It will be observed that practically all of the cement passing the 200 mesh screen is shellac.

Although in each of the three examples first given the grog is composed of three constituents, it might nevertheless be composed of a greater or smaller number of constituents, the relative proportions and sizes of the particles being the important feature. I desire also to mention that composition No. 2, as above given, gives very dependable results, tests showing that various batches of cement constructed according to the composition therein given show very uniform qualities and strength.

I have previously stated that the cement to which the present invention relates is so designed that it is peculiarly desirable for use in joining eye glass crystals to their mountings, but it will be understood that the principles herein disclosed and to which the present invention relates may be equally applicable to cements in general and are not restricted to cements for the said purpose. However, for the purpose of still more clearly indicating the peculiar conditions to be met in the joining of eye glass crystals to their mountings I have illustrated in the drawing one form of mounting to which the crystals are to be attached, and have shown in cross section, in greatly enlarged detail, a cement composed of ingredients corresponding to the disclosures of the present invention.

Figure 1:
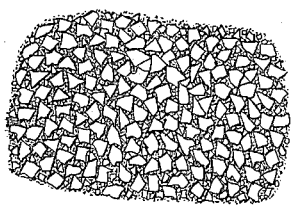
Figure 1 shows a cross section through the cement.

In Fig. 1 it will be observed that the cement is made up of a grog having particles of different sizes according to the disclosures of the present invention, the cementitious material being flowed into said grog to fill the interstices.

Figure 2:
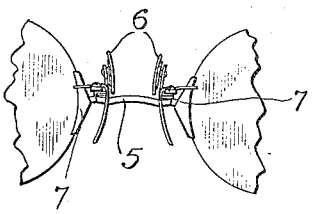
Fig. 2 shows a detail elevation of a bridge piece with the boxes and portions of the crystals in position.
Figure 3:
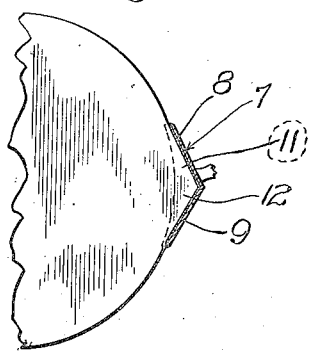
Fig. 3 shows in greatly enlarged detail a section through one box and a portion of the crystal.
Figure 4:
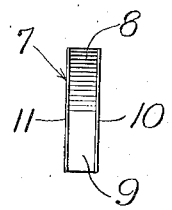
Fig. 4 shows also in greatly enlarged detail a side view of the box which accommodates the crystal.

The mounting illustrated in Fig. 2 comprises the bridge piece 5 with the usual nose clips 6, and the boxes 7. As shown in detail in Figs. 3 and 4 each box has an angular base portion having the sides 8 and 9 which are joined to the side pieces 10 and 11. The end of the crystal is angularly formed to provide a point 12 which seats into the box, and the side portions 10 and 11 of the box are so formed that their edges constitute substantially a continuation of the periphery of the crystal when the crystal is mounted in position. With a box of this form a maximum surface of adhesion is secured with a minimum interference with the field of vision of the crystal. The sides 10 and 11 are only slightly farther apart than the thickness of the crystal so that when the latter is inserted there is present a comparatively thin layer of cement.

Ordinarily the cement as delivered to the market will be in the form of a powder, comprising the grog particles and cementitious material intimately associated. This powder may be made substantially in the following manner: The grog particles of desired proportions and gradings of size, are flushed through with the desired percentage of shellac or other cementitious material. By this I mean that the shellac or other cementitious material is caused to flow through the mass of the grog particles. The completed cement, as thus constituted, is permitted to harden in suitable molds and the sticks or ingots thus cast may be ground up into a powder. This powder in turn will, in effect, consist of the grog particles with the coatings of shellac on them. This powder may be considered as a complete cement in powdered form. It contains the grog particles in desired sizes and gradings, and also the desired proportion of shellac uniformly scattered through the mass and coating or surrounding various grog particles. When this powder is heated the shellac will fuse or melt and the entire mass will thus be cemented or joined together.

In practice the cement powder, or a sufficiently large portion of the stick, will be placed in one of the boxes, and the box with the cement will be heated until the cement fuses. It is also desirable to heat the crystal to approximately the same temperature. Thereupon the crystal may be forced into the box as tightly as possible. This will eject the excess cement leaving just enough to join the crystal to the interior surface of the box.

It will be understood that I do not limit myself in any manner to the constituents given above nor to the percentages mentioned, nor to the use of the cement simply for the joining of eye glass crystals to their mountings, but that I contemplate within the scope of my invention any cement composed of a grog made up of particles of different sizes so proportioned and related as to secure a minimum percentage of voids, combined with a cementitious material present in substantially the proper proportions to fill said voids thereby being present also in the thinnest possible layers or plates.

I claim:

1. As a new article of manufacture, a cement of the character described comprising a grog composed of particles graduated in sizes and percentages of the different sizes to give substantially the minimum percentage and size of voids through which shellac will flow in molten state, in combination with shellac flushed through said grog in percentage substantially correct to fill said voids and coat the particles of the grog, whereby shellac is present throughout the mass of the cement in substantially the thinnest possible layers or plates corresponding to the sizes of the grog particles used.

2. As a new article of manufacture, a cement comprising a grog composed of particles of different sizes, said particles being present substantially in the correct sizes and percentages of the different sizes to give the minimum percentage and size of voids through which shellac will flow in molten state, in combination with shellac flushed through the mass of the grog in substantially the correct percentage to fill the voids and coat the particles of the grog, whereby the shellac is present throughout the body of the cement in substantially the thinnest possible layers or plates corresponding to the sizes of the grog particles used, to thereby give to the shellac the quality of ductility.

3. As a new article of manufacture, a cement for joining crystals to metallic mountings, said cement being composed of a grog made up from particles of different sizes, with the percentages of the different sizes adjusted to give substantially a minimum percentage and size of voids through which a selected cementitious material will flow in molten state, in combination with the selected cementitious material flushed through the grog in substantially the correct percentages to fill the voids and coat the grog particles, whereby the cementitious material possesses the quality of ductility.

4. As a new article of manufacture, a cement for joining crystals to metallic mountings, said cement being composed of a grog having particles of different sizes, said particles of different sizes being present substantially in the correct percentages for the different sizes to give the minimum percentage and size of voids through which a selected cementitious material will flow in molten state, in combination with a selected cementitious material flushed through the body of the grog, the cementitious material being present substantially in the correct percentage to fill the voids and coat the particles to give a desired thickness of layers or plates of cementitious material throughout the body of the cement, whereby the cementitious material possesses the quality of ductility.

5. As a new article of manufacture, a cement composed of a grog made up from particles of material, some of which will pass a 200 mesh screen, some of which will pass a 100 mesh screen, all of which will pass a 50 mesh screen, and substantially all of which will be sustained by a screen of selected mesh, the particles which will pass said screen being present in substantially the correct percentages to give a minimum percentage of voids in the grog through which a cementitious material will flow in molten state, in combination with said cementitious material flushed through the body of the grog and present in substantially the correct percentage to fill the voids and coat the particles of the grog.

6. As a new article of manufacture a cement composed of a grog having particles of different sizes, in combination with shellac flushed through the body of the grog to fill the voids and coat the grog particles, the grog particles being present in such sizes and percentages that substantially 41 per cent. of the cement will pass a 200 mesh screen, 61 per cent. of the cement will pass a 100 mesh screen, and 100 per cent. of the cement will pass a 50 mesh screen.

7. As a new article of manufacture a cement composed of a grog having particles of different sizes in combination with a cementitious material flushed through the body of the grog to fill the voids thereof and coat the grog particles, the grog particles being present in such sizes and percentages that all of the cementitious material plus the grog particles which will pass a 200 mesh screen constitute substantially 41 per cent. of the cement, such that substantially 61 per cent. of the cement will pass a 100 mesh screen, and substantially all of the cement will pass a 50 mesh screen.

8. As a new article of manufacture a cement composed of a grog having particles of different sizes, in combination with a cementitious material flushed through the body of the grog to fill the voids thereof and coat the grog particles, the cementitious material constituting substantially 30 percent. of the cement, and the grog particles being present in such sizes and percentages that all of the cementitious material plus the grog particles which will pass a 200 mesh screen constitute substantially 41 per cent. of the cement, such that substantially 61 per cent. of the cement will pass a 100 mesh screen, and such that substantially all of the cement will pass a 50 mesh screen.

HAROLD H. MORGAN.

Witnesses:
   THOMAS A. BANNING, Jr.,
   WILLIAM A. GRESENS.